United States Patent [19]

Tung et al.

[11] Patent Number: 4,631,314

[45] Date of Patent: Dec. 23, 1986

[54] BLOCK COPOLYMERS UTILIZING A MIXTURE OF CIS AND TRANS-ISOMERS OF 1,3-PENTADIENE

[75] Inventors: Lu H. Tung; Jerald A. Griggs, both of Midland, Mich.

[73] Assignee: The Dow Chemical Company, Midland, Mich.

[21] Appl. No.: 749,080

[22] Filed: Jun. 26, 1985

[51] Int. Cl.[4] .......................................... C08F 297/04
[52] U.S. Cl. ................... 525/314; 525/250; 525/271
[58] Field of Search ...................... 525/271, 250, 314

[56] References Cited

U.S. PATENT DOCUMENTS 3,147,242  9/1964  Stearns .............................. 526/340.2
4,152,370  5/1979  Moczygemba ........................ 525/314

FOREIGN PATENT DOCUMENTS 888624  1/1962  United Kingdom ................ 525/314

*Primary Examiner*—Wilbert J. Briggs, Sr.
*Attorney, Agent, or Firm*—Michael L. Winkelman

[57] ABSTRACT

Block copolymers having two or more blocks may be prepared from vinyl-substituted aromatic hydrocarbons and a mixed isomer mixture of 1,3-pentadiene. At least one block is polymerized from the cis and trans-isomer mixture of 1,3-pentadiene. The amount of the mixed isomer mixture of 1,3-pentadiene polymerized may be increased by including in the mixed isomer mixture a cis-isomer polymerization promoter.

8 Claims, No Drawings

BLOCK COPOLYMERS UTILIZING A MIXTURE OF CIS AND TRANS-ISOMERS OF 1,3-PENTADIENE

BACKGROUND OF THE INVENTION

1. Field of the Invention

This invention relates to block copolymers having at least 2 blocks and utilizing a mixture of cis and trans-isomers of 1,3-pentadiene. More specifically these block copolymers having 2 or more blocks utilize a mixture of cis and trans-isomers of 1,3 pentadiene and a cis-isomer of 1,3-pentadiene polymerizing amounts of a polymerization promoter to increase the amount of total pentadiene polymerized.

2. Description of the Prior Art

Block copolymers of vinyl aromatic compounds and conjugated dienes, principally styrene and butadiene and isoprene are not new in the art. U.S. Pat. No. 3,265,765 to Holden et al. teach block copolymers having the general configuration A-B-A where each A is a monovinyl aromatic hydrocarbon polymer block and B is an elastomeric conjugated diene polymer block. These block copolymers are unvulcanized. U.S. Pat. No. 3,465,065 to Moss et al. teaches the preparation of block copolymers utilizing particular polymerization solvents. These block copolymers have the general configuration A-B-C-B-A where A is a ploymer block of a monovinyl substituted aromatic compound, B is a polymer block of a reacted conjugated diene and C is a monomeric residue of a coupling agent joining the two B blocks. This reference states that one of the difficulties encountered in the production of block copolymers is the presence in normal commercial feeds of undesirable homologues and analogues of desired monomers. Specifically, this reference states isoprene feeds are frequently contaminated with 1,3-pentadiene or piperylene, which causes difficulty in the formation of the third polymer block of the subject block copolymers. According to the reference, the polymerization of that particular polymer chain virtually ceases due to the low rate of addition of piperylene.

In utilizing a mixture of cis and trans-isomers as the conjugated diene to form block copolymers, it has been found that the cis-isomer of 1,3-pentadiene polymerizes negligibly if at all when forming an elastomer center block of an A-B-A configuration block copolymer. This cis-isomer of 1,3-pentadiene residue decreases the total yield of 1,3-pentadiene polymerized. Even more significant, the cis-isomer of 1,3-pentadiene residue inhibits the formation of the third polymerized vinyl-substituted aromatic hydrocarbon block unless living chains of intermediate block copolymers having the configuration A-B-Li are joined with other chains having a similar configuration through the use of a coupling agent.

While a coupling agent solves the problem of polymerization inhibition due to the residue of cis-isomer of 1,3-pentadiene, it does not solve the non-use of the cis-isomer of 1,3-pentadiene in a block copolymer.

SUMMARY OF THE INVENTION

The present invention is a block copolymer of polymerized vinyl-substituted aromatic hydrocarbons and polymerized conjugated dienes. This block copolymer has at least 2 blocks and at least one of these blocks is polymerized from a mixture of cis and trans-isomers of 1,3-pentadiene and a cis-isomer of 1,3-pentadiene polymerizing amount of a polymerization promoter. The polymerization promoter is continuously or incrementally added during the polymerization of the 1,3-pentadiene mixed isomer mixture and is essentially a vinyl-substituted aromatic hydrocarbon.

The use of styrene in the polymerization of 1,3-pentadiene has advantages. Surprisingly, the styrene copolymerized with both isomers of 1,3-pentadiene. This allows better utilization of the 1,3-pentadiene mixed isomer mixture resulting in higher total 1,3-pentadiene polymerized yield than would normally be expected. Reduction of the cis-isomer of 1,3-pentadiene residue which normally interferes with the polymerization of a nonelastomeric end block allows block copolymers to be formed without the use of a coupling agent.

Block copolymers of styrene and pentadiene are more stable to heat and a combination of moisture, heat and ultraviolet light than styrene butadiene and styrene isoprene block copolymers.

Block copolymers of the present invention can be formulated into superior hot melt adhesives and sealants or molded into rubbery articles for outdoor uses due to their good heat and exposure stability. These same advantages of the present block copolymers could also prove useful for coatings for wire and cable.

DETAILED DESCRIPTION

The block copolymers of the present invention are block copolymers prepared from polymerized vinyl-substituted aromatic hydrocarbons and polymerized conjugated dienes, at least one of the conjugated dienes being a mixture of cis and trans-isomers of 1,3-pentadiene.

The vinyl-substituted aromatic hydrocarbons employed in the present invention include but are not limited to styrene, p-methylstyrene, m-methylstyrene, alpha-methylstyrene, t-butylstyrene, p-methyl-alpha-methylstyrene and the like. Preferably the vinyl-substituted aromatic hydrocarbon is styrene or a mixture of p-methylstyrene and m-methylstyrene.

At least one of the blocks of the block copolymer of the present invention must be polymerized from a mixture of cis and trans-isomers of 1,3-pentadiene. Other conjugated dienes may be used in conjunction with the mixed isomer mixture of 1,3-pentadiene or may be used to form separately polymerized blocks of that particular conjugated diene. Representative examples of other conjugated dienes include 1,3-butadiene 2-methyl-1,3-butadiene (isoprene).

The block copolymers of the present invention can be generally described as having a structure of A-B-A. The A blocks need not be identical in composition or glass temperature. The variation of composition may be tapered or may be in random or uniform blocks. There may be more than one glass temperature, but preferably the principal glass temperature is above 60° C. The A blocks may be polymerized from a vinyl-substituted aromatic hydrocarbon, or a mixture of one or more vinyl-substituted aromatic hydrocarbons with one or more conjugated diene monomers.

The B block is an elastomeric block. The composition of the B block may be tapered or may be in random or uniform blocks. It may have more than one glass temperature, but preferably the principal glass temperature is below 15° C. The B block may be a polymer formed from a mixture of mixed isomers of 1,3-pentadiene, a copolymer formed from a mixture of mixed isomers of 1,3-pentadiene, a copolymer formed from a mixture of mixed isomers of 1,3-pentadiene with 1,3-butadiene and/or isoprene, a copolymer formed from a mixture of mixed isomers of 1,3-pentadiene and a minor amount of one or more vinyl-substituted aromatic hydrocarbons, a copolymer formed from a mixture of mixed isomers of 1,3-pentadiene, 1,3-butadiene and at least one vinyl-substituted aromatic hydrocarbon, a copolymer of a mixture of mixed isomers of 1,3-pentadiene, isoprene and at least 1 vinyl-substituted aromatic hydrocarbon, or a copolymer of all 3 conjugated dienes and at least one vinyl-substituted aromatic hydrocarbon.

The polymerization of block copolymers of the present invention takes place in the absence of air and moisture and in the presence of aliphatic, paraffinic or olefinic hydrocarbon solvents and an organolithium initiator. A mild pressure above atmospheric pressure may be of advantage, but is not required.

The hydrocarbon solvents include aliphatic hydrocarbons which are hexane, heptane, or mixtures of these; or olefinic hydrocarbons such as octene and the like. The preferred hydrocarbon solvents are toluene, benzene or cyclohexane.

The organolithium initiators may be monofunctional organolithium initiators, difunctional organolithium initiators or multifunctional organolithium initiators. Monofunctional organolithium initiators include ethyllithium, propyllithium, n-buthyllithium, and s-butyllithium. The preferred monofunctional organolithium initiators are n-butyllithium and s-butyllithium. Difunctional and multifunctional organolithium initiators are described in U.S. Pat. Nos. 3,660,536; 3,663,634; 3,734,973; 3,787,510; 4,172,190; 4,182,818; 4,196,153; 4,196,154; 4,200,718; 4,201,729; and 4,205,016. The preferred difunctional organolithium initiators are the adduct of the s-butyllithium with 1,3-bis-(1-phenylethenyl)benzene, the adduct of s-butyllithium with 1,3-bis[1-(4-methylphenyl)ethenyl]benzene and the other difunctional and multifunctional organolithium initiators described in U.S. Pat. Nos. 4,182,818; 4,196,153; 4,200,718; 4,201,729 and 4,205,016.

The block copolymers of the present invention may be prepared sequentially having random uniform or tapered blocks. Living lithium terminated polymer chains may also be coupled using coupling agents disclosed in U.S. Pat. Nos. 3,465,065; 3,507,943; 3,766,301; and 3,903,201.

Aprotic solvents of a polar nature, such as tetrahydrofuran may be present during the polymerization of the vinyl-substituted aromatic hydrocarbon, but may not be present in any appreciable quantities during the polymerization of the mixture of mixed isomers of 1,3-pentadiene. The presence of such solvents will cause premature chain termination or chain transfer of and polypentadienal anions and prevent the formation of desired block structures, thus producing inferior polymers.

The polymerization of the mixture of mixed isomers of 1,3-pentadiene should not exceed 60° C. in the absence of a vinyl-substituted aromatic hydrocarbon. However, in the presence of a vinyl-substituted aromatic hydrocarbon, the polymerization temperature of the mixture of mixed isomers of 1,3-pentadiene may be increased up to 70° C. to speed up the rate of polymerization of the mixture of mixed isomers of 1,3-pentadiene and the vinyl-substituted aromatic hydrocarbon with no severe damage to the properties of the final polymer. The temperature range for the polymerization of the vinyl-substituted aromatic hydrocarbon blocks is between about 30° and about 100° C.

Use of a copolymer of p-methylstyrene and m-methylstyrene as the end blocks and poly(1,3-pentadiene) as the center block produces a superior hot-melt adhesive that can be maintained molten at a lower temperature due to the lower glass temperature of the copolymer of p-methylstyrene and m-methylstyrene and the higher stability of the poly(1,3-pentadiene). This adhesive should have a very long pot life which is desirable in hot melt adhesive applications. The improved exposure stability of block copolymers of the present invention render them useful for molding rubbery articles for outdoor uses or as coatings for wire and cable.

The following examples illustrate the variety of block copolymers that can be produced utilizing a mixture of cis and trans-isomers of 1,3-pentadiene and the several processes that may be employed to produce these block copolymers. These examples are intended to be illustrative and not limiting of block copolymers of the present invention utilizing a mixture of cis and trans-isomers of 1,3-pentadiene and the processes employed for preparing the same.

As will be apparent to those skilled in the art, modifications and variations can be made in the present invention without departing in spirit or scope of the present invention.

EXAMPLE 1

A 1-liter glass polymerization reactor is purged with dry nitrogen and charged with 400 milliliters of dry toluene and 20 milliliters of purified styrene. The reaction mixture is degassed and heated to 50 degrees centigrade. When the reaction mixture reaches 50 degrees centigrade, 1.9 milliliters of a 0.547 normal solution of secondary butyllithium in cyclohexane is added. The reaction mixture immediately acquires a red coloration. 45 minutes after the addition of the secondary butyllithium, 78 milliliters of 1,3-pentadiene is added. The pentadiene monomer employed in all of the examples contains 34 weight percent cis-isomer and 65 weight percent trans-isomer with 1 percent of inert hydrocarbons. The 1,3-pentadiene is purified by passing twice through an activated alumina column and subsequently vacuum distilled after standing overnight with calcium hydride at room temperature.

On addition of the mixed isomer mixture of 1,3-pentadiene to the reaction mixture, the color changes to light yellow and the mixture maintains a temperature ranging from 50 to 55 degrees centigrade for a period of two and one-half hours. At the end of this period, 2.5 milliliters of a solution of 0.6 grams of phenylbenzoate in 10 milliliters of toluene is added as a coupling agent. The reaction mixture after addition of the phenylbenzoate is maintained at about 50 degrees centigrade for a period of 1 hour. At the end of this period, 0.5 milliliters of glacial acetic acid is added to inactivate lithium ions present. The polymer is recovered by precipitation in methanol and subsequently dried to vacuum. A trace amount of 3,5-di-tertiary butyl-4-hydroxy toluene is added to the polymer as a stabilizer. The resulting polymer is a triblock copolymer of ABA structure, wherein A is a block of polystyrene and B is block of poly(1,3-pentadiene) designated as a SPS triblock copolymer. The resultant block copolymer was subjected to gel permeation chromatographic analysis employing both an ultraviolet detector and a refractive index detector, the polymer having a molecular weight of about 75,500 and a styrene content of about 50 weight percent. A portion of the polymer is compression molded to provide a sample which has a tensile strenght of 2460 pounds per square inch (psi) and an ultimate elongation of 576 percent. The SPS triblock copolymer is compared with other triblock copolymers by preparing test specimens by compression molding to sheets about 30 mils in thickness which are cut into shapes suitable for tensile testing. Test specimens are then exposed to an environment of 100 degrees Fahrenheit and 100 percent humidity together with intense ultraviolet light from a carbon arc lamp. Subsequently, the rupture strength of the exposed specimens at various time periods is measured and recorded and are set forth in Table I, wherein SBS designated a styrene-butadiene-styrene triblock polymer and SIS indicates a styrene-isoprene-styrene triblock polymer. Both polymers contained trace amounts of 3,5-di-tertiary butyl-4-hydroxy toluene (BHT) as a stabilizer. The commercial SBS is believed to contain greater amounts of stabilizer. The results are set forth in Table I.

TABLE I

| Sample | Exposure Time Hours | Rupture Strength psi | Rupture Strength as % of Unexposed |
|---|---|---|---|
| SBS (40% styrene Molecular Weight 193,000) | 0 | 3800 | 100 |
| | 22 | 609 | 16 |
| | 58 | 622 | 16 |
| | 104 | 537 | 14 |
| SIS (14% styrene Molecular Weight 192,900) | 0 | 3382 | 100 |
| | 22 | 0 | 0 |
| SPS | 0 | 2460 | 100 |
| | 22 | 1637 | 67 |
| | 58 | 1042 | 42 |
| | 104 | 961 | 39 |
| SBS (commercial 30% styrene Molecular Weight 110,000) | 0 | 4636 | 100 |
| | 22 | 455 | 10 |
| | 58 | 377 | 8 |
| | 104 | 360 | 8 |

EXAMPLE 2

The procedure of Example 1 was repeated with the exception that the polymerization time for the mixed isomer mixture of 1,3-pentadiene is extended from 2.5 hours at 50–55 degrees centigrade to 4 hours at 50 degrees centigrade. The recovered polymer is another styrene-1,3-pentadiene-styrene triblock copolymer. Employing a gel chromatography analysis, the weight average molecular weight is determined to be 89,300 and it contains 41 weight percent styrene. A compression molded sample is determined to have a rupture strength of 2,083 pounds per square inch and an ultimate elongation of 844 percent. The heat stability of the SPS copolymer is compared with the heat stability of a commercially available oil extended and stabilized SBS and other copolymers. The copolymers are subjected to 200 degrees centigrade, employing a melt indexer as the measuring device for various periods of time. The melt flow rate (MFR) is calculated from the amount of polymer extruded from the melt indexer in accordance with Schedule G of the ASTM test D-1238. Five minutes is required heating time for the polymer to reach measurement temperature. The percent change of melt flow rate is calculated using the 5 minute melt flow rate as a base. The results are set forth in Table II.

TABLE II

| Sample | Heating Time Minutes | MFR | % Change MFR[a] |
|---|---|---|---|
| SBS (Oil extended and stabilized)[b] | 5 | 22.2 | — |
| | 10 | 20.3 | −8.6 |
| | 20 | 19.9 | −10.4 |
| | 40 | 7.1 | −68.0 |
| | 60 | 9.2 | −58.4 |
| SBS[c] (30% Styrene Molecular Weight 104,000) | 5 | 0.96 | — |
| | 10 | 0.68 | −29 |
| | 20 | 0.27 | −72 |
| | 40 | 0.02 | −98 |
| | 60 | 0 | −100 |
| SIS[c] (36% Styrene Molecular Weight 289,500) | 5 | 0.43 | — |
| | 10 | 0.63 | 46.5 |
| | 20 | 0.84 | 95.4 |
| | 40 | 1.45 | 237 |
| | 60 | 2.09 | 386 |
| SPS (41% Styrene Molecular Weight 89,300) | 5 | 25.7 | — |
| | 10 | 30.8 | 19.8 |
| | 20 | 37.7 | 46.7 |
| | 60 | 37.3 | 45.1 |

[a]% change MFR = [(MFR − MFR5)/MFR5] × 100
[b]A formulated styrene-butadiene-styrene (SBS) triblock copolymer containing an SBS of 30% styrene and a molecular weight of 110,000; 50 parts FDA oil; an unknown amount of low molecular weight poly(alpha-methylstyrene); and stabilizers.
[c]SBS styrene-butadiene-styrene triblock copolymer was prepared by a method described in example 2 U.S. Pat. No. 4,196,154. SIS styrene-isoprene-styrene triblock copolymer was prepared by conventional methods of preparing SIS such as the one described in U.S. Pat. No. 3,265,765.

The above results show that SBS crosslinks under heat; SIS degrades under heat; SPS degrades under heat but to a much lesser extent. The stabilizer loaded commercial SBS crosslinks to a lesser extent than the other SBS but the percent change is not better than the SPS sample which contains only a trace of BHT.

EXAMPLE 3

The procedure of Example 2 is repeated and the reaction mixture sampled by withdrawing during the polymerization of the mixed isomer mixture 1,3-pentadiene samples which are analyzed by gas chromatography for trans-1,3-pentadiene and cis-1,3-pentadiene. The results are set forth in Table III.

TABLE III

| Time Hours | Trans-1,3-pentadiene moles/liter | Cis-1,3-pentadiene moles/liter |
|---|---|---|
| 0 | 1.00 | .55 |
| 1 | 0.85 | .57 |
| 2 | 0.67 | .56 |
| 4 | 0.44 | .53 |

The results indicate that only the trans-isomer is being incorporated into the triblock copolymer structure.

EXAMPLE 4

A 1 liter glass reactor is purged with nitrogen and charged with 400 milliliters of dry toluene together with 25 milliliters of purified methyl styrene. The methyl styrene is about 60 percent meta-isomer and about 40 percent para-isomer. The resultant mixture is degassed and heated to 50 degrees centigrade, whereupon a 1.9 milliliter portion of a 0.532 normal secondary-butyllithium solution in cyclohexane is added. About 90 minutes after the addition of the secondary-butyllithium, 98 milliliters of the mixed isomer mixture of 1,3-pentadiene is added. The mixed isomer mixture of 1,3-pentadiene is purified by passing twice through an activated alumina column and subsequently vacuum distilled in the presence of dibutylmagnesium. About 4 hours after the addition of the 1,3-pentadiene, 2.5 milliliters of a solution of 0.6 grams of phenylbenzoate in 10 milliliters of toluene is added to the reaction mixture as a coupling agent to form a polymer of ABA configuration. Glacial acetic acid is added to inactivate any remaining lithium. Polymer is recovered by precipitation in methanol and subsequently vacuum dried. The A blocks are a copolymer of para-methyl styrene and meta-methylstyrene and B is a block of poly(1,3-pentadiene).

During the polymerization, samples of the reaction mixture are withdrawn for gas chromatography analysis at various times during the polymerization. The results are set forth in Table IV.

TABLE IV

| Time hours; minutes | Trans-1,3-pentadiene moles/liter | Cis-1,3-pentadiene moles/liter | m-methyl-styrene moles/liter | p-methyl-styrene moles/liter |
|---|---|---|---|---|
| 0 | 0 | 0 | .22 | .15 |
| 0:45 | 0 | 0 | .01 | .02 |
| 1:30 | 1.14 | .60 | 0 | 0 |
| 3:30 | .79 | .60 | 0 | 0 |
| 5:30 | .63 | .59 | 0 | 0 |

The resultant polymer contains 52.6 weight percent methyl styrene and 47.4 weight percent 1,3-pentadiene polymerized therein. Compression molded samples have a tensile strength of 970 pounds per square inch and an ultimate elongation of 480 percent.

EXAMPLE 5

A 1 liter glass reactor is purged with nitrogen and charged with 400 milliliters of dry toluene and 20 milliliters of purified styrene. The reaction mixture is degassed and heated to 50 degrees centigrade. On reaching 50 degrees centigrade, 1.8 milliliters of 0.58 normal secondary-buthyllithium solution in cyclohexane is added to initiate styrene polymerization. Forty-five minutes after addition of the initiator, the reaction mixture is cooled by surrounding the reactor with ice water. The reactor is subsequently charged with 25 grams of 1,3-butadiene and 60 milliliters of the mixed isomer mixture of 1,3-pentadiene. After the addition of the dienes, the reaction mixture is then heated to a temperature within a range of between 50-60 degrees centigrade for a period of 4 hours. At the end of the 4-hour period, 2.5 milliliters of a phenylbenzoate solution is added as a coupling agent. The phenylbenzoate solution contains 0.6 grams of phenylbenzoate in 10 milliliters of toluene. The phenylbenzoate serves as a coupling agent. The reaction mixture is maintained at 50 degrees centigrade for an additional hour at which time the resultant polymer is recovered by precipitation in nethanol and dried under vacuum. The dried polymer is analyzed by proton nuclear magnetic resonance which indicated that it contained 32.6 weight percent styrene and has a butadiene to 1,3-pentadiene ratio of 66.8/33.2 by weight. The resultant polymer is a pentablock copolymer of ABCBA configuration where A is a polystyrene block, B is a polybutadiene block, and C is a poly(1,3-pentadiene) block. The mixed isomer mixture of 1,3-pentadiene employed is purified by passing twice through an activated alumina column and treated with dibutylmagnesium prior to distillation. The butadiene monomer is treated by passing first through a column packed with the potassium form of a strong acid ion exchange resin and subsequently through a column of activated alumina. On compression molding, the tensile strength is determined to be 2980 pounds per square inch and the ultimate elongation 1200 percent. A differential scanning calorimeter is employed to determine the glass transition temperature which is −75 degrees centigrade as compared to −37 degrees centigrade for a styrene-poly(1,3-pentadiene)-styrene block copolymer. The melt flow rate (MFR) is determined at various periods of time in the procedure utilized in Example 4 and the values are set forth below:

| Time | 5 minutes | 10 minutes | 20 minutes | 40 minutes | 60 minutes |
|---|---|---|---|---|---|
| MFR | 0.51 | 0.54 | 0.60 | 0.56 | 0.44 |
| % change | — | +5.9 | +17.7 | +9.8 | −14.0 |

The exposure stability is also measured under the same conditions as in Example 1 with the exception that a shorter exposure time is used, and the results are as follows:

| Exposure Times | 0 hours | 5 hours | 10 hours | 22 hours | 58 hours |
|---|---|---|---|---|---|
| Rupture Strength PSI | 2980 | 2934 | 2584 | 382 | 356 |
| % Strength retained | 100 | 98.5 | 85.5 | 12.8 | 12.0 |
| % Strength retained in a SBS sample | 100 | 73.7 | 42.0 | 8.5 | 8.4 |

EXAMPLE 6

The procedure of Example 5 is repeated with the exception that 12.3 grams of butadiene and 90 milliliters of the mixed isomer mixture of 1,3-pentadiene are employed for the formation of the center block. During polymerization of the center block, samples are withdrawn from the reactor and analyzed by gas chromatography. The results at various times are indicated below:

| Time hours | Butadiene moles/liter | Trans-1,3-pentadiene moles/liter | Cis-1,3-pentadiene moles/liter |
|---|---|---|---|
| 0 | .43 | 1.11 | .58 |
| 1 | .05 | 1.02 | .58 |
| 2 | .01 | .91 | .58 |
| 3 | 0 | .75 | .55 |

The results of the analyses clearly indicate that butadiene is polymerized to form a polybutadiene block and subsequently a poly(1,3-pentadiene) block is formed. There is no indication obtained that cis-pentadiene entered into the polymerization in any significant quantities. The resultant polymer obtained is of the ABCBA structure where A is a polystyrene block, B is a polybutadiene block and C is a poly(1,3-pentadiene) block. The amount of styrene contained in the polymer is determined to be 36.3 weight percent and the butadiene to pentadiene ratio by weight is 38.7 to 61.3. A differential scanning calorimeter is employed to determine that the glass temperature of the polymer is −50 degrees centigrade. A compression molded sample has a rupture strength of 2100 pounds per square inch and an ultimate elongation of 1110 percent.

EXAMPLE 7

The procedure of Example 6 is repeated with the following exceptions. At the end of the styrene polymerization period, the reactor is maintained at about 50 degrees centigrade and after the addition of the mixed isomer mixture of 1,3-pentadiene, the 1,3-butadiene monomer is continuously added until near the end of the polymerization. The recovered polymer is a triblock of ABA structure wherein A is a polystyrene and B is a block of butadiene and 1,3-pentadiene copolymer. The block copolymer contains 33.8 weight percent styrene polymerized therein and the ratio of butadiene to pentadiene in the B block is 35.7 to 64.3 by weight. The glass temperature is determined by differential scanning calorimeter to be −58 degrees centigrade. A compression molded sample of the polymer has a rupture strength of 1,410 pounds per square inch and an ultimate elongation of 1,240 percent.

EXAMPLE 8

The procedure of Sample 5 is repeated with the exception that the 25 grams of butadiene is replaced by 30 milliliters of isoprene and the 60 milliliters is reduced to 50 milliliters. The reaction mixture is not cooled to ice water temperature before the addition of the diene monomers. The resultant polymer has a penta-block structure of ABCBA configuration wherein A is a polystyrene block; B is a polyisoprene block; and C is a poly(1,3-pentadiene) block. Analysis employing proton nuclear magnetic resonance indicates a styrene content of 43.1 percent and an isoprene to pentadiene ratio by weight of 85.7 to 14.3.

Employing the procedure of Example 1, the melt flow rate is determined and the results are as follows:

|  | Time | | | | |
| --- | --- | --- | --- | --- | --- |
|  | 5 minutes | 10 minutes | 20 minutes | 40 minutes | 60 minutes |
| MFR | 2.6 | 3.1 | 4.0 | 5.6 | 6.5 |
| % change | — | 21.9 | 57.0 | 119.5 | 154.3 |

These results indicate that the penta-block copolymer is better than the styrene-isoprene-styrene block copolymer of Example 2, but poorer than styrene-polypentadiene-styrene block copolymer.

Employing the exposure test as described in Example 1, the results are as follows:

|  | Time | | | | |
| --- | --- | --- | --- | --- | --- |
|  | 0 hours | 5 hours | 10 hours | 22 hours | 58 hours |
| Rupture Strength psi | 1935 | 1919 | 1183 | 370 | 246 |
| % Strength retained | 100 | 99.2 | 61.1 | 19.1 | 12.7 |

These results indicate that the penta-block copolymer at 5 and 10-hour exposures is better than styrene-butadiene-styrene block copolymer as shown in Example 5. At longer exposures the penta-block copolymer is comparable to styrene-butadiene-styrene block copolymer as shown in Example 5, but poorer than the styrene-1,3-pentadiene styrene block copolymer as shown in Example 2. The glass temperature of the penta-block copolymer as determined by differential scanner calorimeter is −47 degrees centigrade.

EXAMPLE 9

The procedure of Example 8 is repeated except that isoprene is continually added during the diene monomer polymerization. The resulting polymer is a block copolymer of ABA wherein A represents a polystyrene and B is an isoprene-1,3-pentadiene copolymer block. Styrene content by proton nuclear magnetic resonance is 40.2 percent and the ratios by weight of isoprene to 1,3-pentadiene were 75.7 to 24.3.

EXAMPLE 10

The procedure of Example 9 is repeated with the exception that styrene is substituted for isoprene in the continual addition step. The addition of styrene during the 1,3-pentadiene polymerization is at a rate of 2.4 milliliters per hour for a period of 5 hours and an additional polymerization hour is allowed before the addition of the phenylbenzoate solution. The volume of the mixed isomer mixture of 1,3-pentadiene employed is 48 milliliters instead of the 50 milliliters. The resulting polymer is a triblock copolymer a ABA configuration wherein A represents a block of polystyrene and B is a block of a copolymer of styrene and 1,3-pentadiene. The heat stability of the polymer is determined by the melt flow technique employed in Example 2 and the results are shown below:

|  | Time | | | | |
| --- | --- | --- | --- | --- | --- |
|  | 5 minutes | 10 minutes | 20 minutes | 40 minutes | 60 minutes |
| MFR | 45.0 | 55.3 | 57.7 | 58.7 | 50.5 |
| % change | — | 23.0 | 28.3 | 30.6 | 12.3 |

The material extruded from the melt index apparatus after 1 hour of heating shows no apparent difference form the earlier extruded material. It appears to be strong, tacky and had a sparkling appearance.

EXAMPLE 11

A difunctional organolithium polymerization initiator solution is prepared by reacting 0.170 gram of 1,3-bis(1-phenylethenyl)benzene in 22.5 milliliters of toluene with 2.4 milliliters of 0.552 normal secondary-buthyllithium solution of cyclohexane at room temperature for a period of about 1 hour. The preparation of such difunctional organolithium initiators is described at length in U.S. Pat. No. 4,196,154, the teachings of which are incorporated be reference thereto. One milliliter of isoprene is added and the solution heated to 70–75 degrees centigrade for a period of 10 minutes. A nitrogen purged 1-liter glass reactor is charged with 400 milliliters of dry toluene, 70 milliliters of the mixed isomer mixture of 1,3-pentadiene and 1 milliliter of styrene. The reaction mixture is heated to 60 degrees centigrade and at the end of the 10 minutes heating period, the difunctional organolithium initiator is added to the 1 liter reactor. Polymerization is permitted to proceed for a period of 15 minutes. At this time, continual addition of styrene is begun at a rate of 1 milliliter per hour for a period of three hours. At the end of the three hour period, the temperature of the reaction mixture is raised to 65 degrees centigrade and the styrene continual addition rate is increased to 15 milliliters per hour for a period of two hours. Thirty minutes after the styrene addition has stopped, the mixture being maintained at 65 degrees centigrade, glacial acetic acid is added to terminate any active lithium present in the system. The resultant polymer is recovered by precipitation in methanol. The polymer is subsequently dried under vacuum. The recovered polymer is a triblock copolymer of ABA configuration wherein A is a block of 1,3-pentadiene and styrene copolymer rich in styrene; and B is a block of 1,3-pentadiene and styrene copolymer but rich in 1,3-pentadiene. During the course of polymerization, portions of the polymerization mixture are sampled and analyzed by gas chromatography with the following results:

| Time minutes | Trans-1,3-pentadiene moles/liter | Cis-1,3-pentadiene moles/liter | Styrene moles/liter |
| --- | --- | --- | --- |
| 0 | .97 | .51 | .01 |
| 105 | .67 | .42 | .01 |
| 195 | .40 | .36 | .02 |
| 345 | .04 | .01 | .06 |

Gas chromatography analysis indicates that both trans and cis-isomers of 1,3-pentadiene entered into the polymerization. Heat stability is measured employing the general procedure of Example 1 and the results are as follows:

| | Time | | | | |
| --- | --- | --- | --- | --- | --- |
| | 5 minutes | 10 minutes | 20 minutes | 40 minutes | 60 minutes |
| MFR | 7.5 | 7.1 | 7.4 | 7.5 | 7.8 |
| % change | — | −4.2 | −.9 | 0 | +5.1 |

Compression molded samples of the block copolymers have a rupture strength of 1050 pounds per square inch and an ultimate elongation of 956 percent.

EXAMPLE 12

A difunctional organolithium polymerization initiator solution is prepared by reacting 0.177 grams of 1,3-bis(1-phenylethenyl)benzene in 12.6 milliliters of toluene with 1.9 milliliters of a 0.532 normal secondary-butyllithium solution in cyclohexane. The reaction is conducted under nitrogen at room temperature. A 1-liter glass polymerization reactor is nitrogen purged and charged with 400 milliliters of purified mixed isomers, 1,3-pentadiene and 7 grams of 1,3-butadiene. The reaction mixture is heated to about 65 degrees centigrade and the difunctional organolithium initiator solution is added thereto. About 2 hours after the addition of the difunctional initiator 10 milliliters of styrene is added. After an additional 2 hours following the addition of styrene, 20 milliliters of styrene are added. An hour after the second styrene addition, the polymerization is terminated by the addition of 1 milliliter of glacial acetic acid. The polymer is recovered from a solution by precipitation in methanol and is subsequently vacuum dried. The polymerization is sampled at various periods of time with time 0 being the time of addition of the difunctional initiator. The samples are analyzed by gas chromatography with the following results:

| Time hours | Butadiene moles/liter | Trans-1,3-pentadiene moles/liter | Cis-1,3-pentadiene moles/liter | Styrene moles/liter |
| --- | --- | --- | --- | --- |
| 0 | .28 | .68 | .36 | 0 |
| 2 | .02 | .32 | .29 | .19 |
| 3 | .01 | .10 | .14 | .02 |
| 4 | 0 | .05 | .11 | .33 |
| 5 | 0 | 0 | 0 | .09 |

The result of the gas chromatographic analysis indicates that both the trans and cis-isomers of 1,3-pentadiene copolymerized. It is believed that the resultant polymer had a complex structure which can be approximately represented by the configuration ACPBCA wherein B is a polybutadiene block; P is a poly(1,3-petadiene) block; C is a styrene and 1,3-pentadiene copolymer block with a varying composition; and A is similar to C but richer in styrene than C. Heat stability is evaluated employing the procedure of Example 1 with the following results:

| | Time | | | | |
| --- | --- | --- | --- | --- | --- |
| | 5 minutes | 10 minutes | 20 minutes | 40 minutes | 60 minutes |
| MFR | 6.9 | 6.3 | 6.4 | 5.7 | 4.0 |
| % change | | −7.7 | −7.0 | −17.6 | −41.6 |

A compression molded sample of the polymer has a rupture strength of 1126 pounds per square inch and an ultimate elongation of 1300 percent.

EXAMPLE 13

A difunctional organolithium initiator solution is prepared under a nitrogen atmosphere by reacting a solution of 0.156 grams of 1,3-bis(1-phenylethenyl)benzene dissolved in 22.3 milliliters of toluene with 2.2 milliliters of 0.552 normal-secondary butyllithium solution in cyclohexane at room temperature for a period of 1 hour. One milliliter of isoprene is added and the solution heated to a temperature of 70–75 degrees centigrade for a period of 10 minutes. At the end of the 10-minute period, the initiator solution is charged to a nitrogen purged 1-liter glass polymerization reactor containing a mixture of 400 milliliters of dry toluene, 70 milliliters of the mixed isomer mixture of 1,3-pentadiene, 0.5 milliliters of styrene and 3.5 grams of butadiene. At the time of addition of the initiator, the contents of the 1-liter polymerization reactor are at a temperature of 60 degrees centigrade. Thirty minutes after the addition of the initiator solution, styrene is continually added at a rate of about 1 milliliter per hour for a period of 3 hours. At the end of the 3-hour period, the temperature of the reactor contents is increased to 65 degrees centigrade and the styrene addition rate is increased to 15 milliliters per hour for a period of 2 hours. When the addition of styrene is stopped, the mixture is maintained at 65 degrees centigrade for an additional hour and glacial acetic acid is added to terminate the polymerization. The polymer is recovered by precipitation in methanol and is vacuum dried. The yield of polymer is almost quantitative. The resultant polymer is a block copolymer of ACBCA structure wherein A represents a block of styrene and 1,3-pentadiene copolymer rich in styrene; C represents blocks of styrene and 1,3-pentadiene copolymer rich in pentadiene; and B is a polybutadiene block. A compression molded sample of the polymer has a tensile strength of 1038 pounds per square inch and an ultimate elongation of 1392 percent.

EXAMPLE 14

The procedure of Example 13 is repeated with the exception that butadiene is omitted. The yield is almost quantitative and the recovered polymer is a triblock copolymer of the structure ABA wherein A is a copolymer block of styrene and 1,3-pentadiene rich in styrene, and B is a copolymer block of styrene and 1,3-pentadiene rich in pentadiene. Heat stability is measured in accordance with the procedure of Example 2 and the results obtained are as follows:

| | Time | | | | |
|---|---|---|---|---|---|
| | 5 minutes | 10 minutes | 20 minutes | 40 minutes | 60 minutes |
| MFR | 1.21 | 1.26 | 1.12 | 1.01 | .87 |
| % change | | +4.1 | −7.0 | −16.5 | −28.1 |

A compression molded sample of the polymer shows a tensile strength at break of 1235 pounds per square inch and an ultimate elongation of 1392 percent.

EXAMPLE 15

A difunctional organolithium initiator solution is prepared under a nitrogen atmosphere by reacting 0.143 gram of 1,3-bis(1-phenylethenyl)benzene in 22.1 milliliters of toluene with 1.9 milliliters of 0.532 normal secondary-butyllithium cyclohexane solution at room temperature for a period of 1.5 hours. At the end of the 1.5 hours period, 1 milliliter of isoprene is added to the solution and the solution heated to a temperature of from 70-75 degrees centigrade for a period of 15 minutes. At the end of the 15-minutes period, the solution is charged to a nitrogen purged 1 liter glass reactor containing 400 milliliters of dry toluene, 30 milliliters of the mixdd isomer mixture of 1,3-pentadiene. The temperature of the reaction mixture is 53 degrees centigrade. Polymerization is permitted to proceed for a period of 2 hours after the addition of the initiator whereupon 10 milliliters of styrene is added and the reaction mixture is heated to 60 degrees centigrade. One hour after the addition of the 10 milliliters of styrene, 40 milliliters of styrene is added and the polymerization continued for an additional 2 hours. At the end of later 2-hour period, glacial acetic acid is added to terminate the reactive polymer chains. The polymer is recovered by precipitation in methanol and vacuum dried. The polymer is a penta-block copolymer of ACBCA structure wherein A is a block of styrene and 1,3-pentadiene copolymer rich in styrene; C is a block of styrene and 1,3-pentadiene copolymer rich in 1,3-pentadiene; and B is a block of poly(1,3-pentadiene). The reaction mixture during the polymerization is sampled periodically with time 0 being the time of the difunctional initiator. The samples are analyzed by gas chromatography with the following results:

| Time hours | Trans-1,3-pentadiene moles/liter | Cis-1,3-pentadiene moles/liter | Styrene moles/liter |
|---|---|---|---|
| 0 | .43 | .23 | 0 |
| 1 | .35 | .20 | 0 |
| 2 | .33 | .20 | .19 |
| 3 | .20 | .13 | .09 |
| 4 | .05 | .03 | .04 |
| 5 | 0 | 0 | 0 |

Polymerization is complete at the end of 5 hours. The final composition is 68.8 weight percent styrene and 31.2 percent pentadiene. A compression molded sample has a tensile strength of 1820 pounds per square inch and an elongation at break of 60 percent. Heat stability is determined by melt flow rate as in Example 2 and the results are as follows:

| Time | 5 minutes | 10 minutes | 20 minutes | 40 minutes | 60 minutes |
|---|---|---|---|---|---|
| MFR | 5.0 | 4.8 | 4.8 | 5.0 | 5.2 |
| % change | | −5.2 | −4.6 | −.4 | +3.2 |

EXAMPLE 16

A nitrogen purged 1-liter glass polymerization reactor is charged with 400 milliliters dry toluene, 20 milliliters of purified styrene; and 1.3 milliliters of 0.519 normal-secondary-butyllithium cyclohexane solution. The toluene-styrene mixture is at a temperature of 50 degrees centigrade on addition of the butyllithium. Polymerization of the styrene is permitted for a period of 45 minutes from the time of addition of the butyllithium. At the end of the 45 minutes period, 70 milliliters of purified mixed isomers of 1,3-pentadiene were added. The pentadiene is purified by passing twice through an activated alumina column and vacuum distilled over secondary butyllithum. On addition of the 1,3-pentadiene, the polymerization temperature is raised to 60 degrees centigrade and styrene is added continually at a rate of 1 milliliter per hour for a period of 3 hours. At the end of the 3-hour period, the rate of styrene addition is increased to 10 milliliters per hour for a period of 30 minutes and subsequently to 20 milliliters per hour for an additional 30 minutes. After the continual addition had ended, an additional 17 milliliters of styrene is added and the polymerization mixture is maintained at 60 degrees for an additional 1.5 hours. The living polymer chains are then terminated with glacial acetic acid and the polymer precipitated in methanol and dried in a vacuum. The polymer obtained has a configuration of ABCDE, wherein A is a polystyrene block; B,C,D and E represent copolymer blocks of styrene and 1,3-pentadiene with increasing amounts of styrene in the copolymer. The total amount of styrene in the polymer is 39.6 weight percent as determined from gas chromatography analysis of the monomers consumed. A compression molded sample has a tensile strength of 1285 pounds per square inch and an ultimate elongation of 712 percent. A portion of the polymer was used to determine heat stability by melt flow rate as in Example 2 with the following results:

| Time | 5 minutes | 10 minutes | 20 minutes | 40 minutes | 60 minutes |
|---|---|---|---|---|---|
| MFR | 4.0 | 3.8 | 4.6 | 4.4 | 5.3 |
| % change | | −6.9 | +13.6 | +7.9 | +31.9 |

EXAMPLE 17

A 1-liter nitrogen purged glass polymerization reactor is charged with 400 milliliters of dry toluene, 20 milliliters of purified styrene and 1.6 milliliters of 0.519 normal-secondary-butyllithium in cyclohexane solution. The contents of the reactor are maintained at 50 degrees centigrade for 45 minutes. Seventy milliliters of mixed isomers of 1,3-pentadiene prepurified as in Example 16 is added thereto. The polymerization temperature is raised to 60 degrees centigrade and styrene is added continually at the rate of 1 milliliter per hour for 3 hours. The rate of styrene addition is then increased to 20 milliliters per hour and the polymerization temperature to 65 degrees centigrade. After a period of 30 minutes adding styrene at the rate of 20 milliliters per hour, continual addition is stopped and 22 milliliters of styrene are added to the reaction mixture. The reaction mixture is held at 65 degrees centigrade for a period of 2 hours after the addition of the 22 milliliters of styrene. The reaction is ended with glacial acetic acid and the block copolymer is recovered by precipitating in methanol and vacuum drying. The resultant block copolymer has a structure of ABCD wherein A is a polystyrene block and B, C, and D are blocks of styrene and 1,3-pentadiene copolymer with increasing amounts of styrene copolymer. The reaction mixture is sampled during the polymerization at various times wherein time 0 is taken as the time of addition of the butyllithium. Samples are analyzed by gas chromatography with the following results:

| Time hours: minutes | Trans-1,3-pentadiene moles/liter | Cis-1,3-pentadiene moles/liter | Styrene moles/liter |
|---|---|---|---|
| 0 | 0 | 0 | .42 |
| 0:45 | 1.03 | .54 | .02 |
| 2:15 | .63 | .47 | .01 |
| 3:45 | .32 | .36 | .01 |
| 4:15 | .20 | .27 | .14 |
| 4:45 | .04 | .05 | .07 |
| 6:15 | 0 | 0 | 0 |

The composition of the resultant polymer is 51.3 weight percent styrene and 48.7 weight percent pentadiene. A compression molded sample of the polymer has a tensile strength of 2160 pounds per square inch. The ultimate elongation is 280 percent. Heat stability is evaluated by melt flow rate as in Example 2 with the following results:

| Time | 5 minutes | 10 minutes | 20 minutes | 40 minutes | 60 minutes |
|---|---|---|---|---|---|
| MFR | 7.0 | 7.3 | 8.3 | 8.8 | 9.5 |
| % change | | +4.3 | +19.4 | +27.1 | +36.7 |

While certain representative embodiments and details have been shown for the purpose of illustrating the invention, it will be apparent to those skilled in the art that various changes and modifications can be made without departing from the spirit and scope of the invention.

What is claimed is:

1. A block copolymer prepared in a hydrocarbon solvent with an organolithium initiator of a polymerized vinyl-substituted aromatic hydrocarbon and a polymerized conjugated diene comprising:
   (a) at least two blocks; and
   (b) at least one block polymerized from a mixture of cis and trans-isomers of 1,3-pentadiene and a cis-isomer of 1,3-pentadiene polymerizing amount of a polymerization promoter continuously or incrementally added during the polymerization of the 1,3-pentadiene mixed isomer mixture, the polymerization promoter consisting essentially of a vinyl-substituted aromatic hydrocarbon.

2. A block copolymer, as recited in claim 1, wherein the polymerization promoter consists essentially of styrene.

3. A block copolymer, as recited in claim 2, wherein the polymerized vinyl-substituted aromatic hydrocarbon is styrene.

4. A block copolymer, as recited in claim 1, wherein the mixture of mixed isomers of 1,3-pentadiene comprises about two-thirds trans-isomer by mixture weight and about one-third cis-isomer by mixture weight.

5. A block copolymer wherein the block copolymer comprises a structure represented by any of the following formulae:

S-(P/S)
S-(P/S)-S
(S/P)-(P/S)-(S/P)
(S/P)-(P/S)-P-B-P-(P/S)-(S/P)
(S/P)-(P/S)-B-(P/S)-(S/P)
(S/P)-(P/S)-P-(P/S)-(S/P)
S-(P/S)-(P/S)$_1$-(P/S)$_2$
S-(P/S)-(P/S)$_1$-(P/S)$_2$-(P/S)$_3$ where S is a homopolymerized vinyl-substituted aromatic hydrocarbon, B is a conjugated diene homopolymer or copolymer, P is poly(1,3-pentadiene) polymerized from a mixture of mixed isomers of 1,3-pentadiene, S/P is a copolymer having a major amount of a polymerized vinyl-substituted aromatic hydrocarbon and a minor amount of a polymerized mixture of mixed isomers of 1,3-pentadiene, P/S is a copolymer having a major amount of a polymerized mixture of mixed isomers of 1,3-pentadiene and a minor amount of a polymerized vinyl-substituted aromatic hydrocarbon, (P/S)$_1$, (P/S)$_2$ and (P/S)$_3$ are copolymers of a polymerized mixture of mixed isomers of 1,3-pentadiene and a vinyl-substituted aromatic hydrocarbon, where the subscripts going from 1 to 3 refer to decreasing amounts of polymerized mixed isomers of 1,3-pentadiene.

6. A block copolymer, as recited in claim 4, wherein
   A. the vinyl-substituted aromatic hydrocarbon to be polymerized is selected from the group consisting of:
      (a) styrene
      (b) p-methylstyrene
      (c) m-methylstyrene
      (d) alpha-methylstyrene
      (e) t-butylstyrene
      (f) p-methyl-alpha-methylstyrene
      (g) a mixture of at least two hydrocarbons (a) through (f); and
   B. the conjugated diene to be polymerized is selected from the group consisting of:
      (a) 1,3-butadiene
      (b) 2-methyl-1,3-butadiene
      (c) a mixture of mixed isomers of 1,3-pentadiene
      (d) a mixture of at least two conjugated dienes (a) through (c).

7. A block copolymer, as recited in claim 5, wherein the vinyl-substituted aromatic hydrocarbon is styrene and the mixture of mixed isomers of 1,3-pentadiene comprises about two-thirds trans-isomer by 1,3-pentadiene mixture weight and about one-third cis-isomer by 1,3-pentadiene mixture weight.

8. A block copolymer, as recited in claim 1, wherein the melt flow rate of the block copolymer after heating at 200 degrees C. for 60 minutes does not vary from the melt flow rate of the block copolymer after heating at 200 degrees C. for 5 minutes by greater than ±50 percent.

* * * * *